(12) United States Patent
Singh

(10) Patent No.: US 7,742,519 B2
(45) Date of Patent: Jun. 22, 2010

(54) METHOD FOR RATE MATCHING IN DATA TRANSMISSION

(75) Inventor: Damanjit Singh, Ludhiana (IN)

(73) Assignee: ST-Ericsson SA, Geneva (CH)

( * ) Notice: Subject to any disclaimer, the term of this patent is extended or adjusted under 35 U.S.C. 154(b) by 893 days.

(21) Appl. No.: 11/311,024

(22) Filed: Dec. 19, 2005

(65) Prior Publication Data

US 2007/0140326 A1  Jun. 21, 2007

(51) Int. Cl.
*H04B 3/46* (2006.01)
*H04B 17/00* (2006.01)
*H04Q 1/20* (2006.01)

(52) U.S. Cl. .................. 375/225; 375/220; 375/356

(58) Field of Classification Search ................. 375/225
See application file for complete search history.

(56) References Cited

U.S. PATENT DOCUMENTS 6,744,744 B1 * 6/2004 Tong et al. ................ 370/320
6,888,851 B1 * 5/2005 Qian ........................ 370/523
2003/0171121 A1 * 9/2003 Kim et al. .................. 455/451
2005/0105605 A1 * 5/2005 Morsberger et al. ........ 375/225

OTHER PUBLICATIONS (3GPP) 3rd Generation Partnership Project; Technical Specification Group Radio Access Network; Multiplexing and channel coding (FDD) (Release 6); Appendix 3GPP TS 25.212; Dec. 2004; pp. 1-82; V.6.30; France.

* cited by examiner

*Primary Examiner*—Shuwang Liu
*Assistant Examiner*—Lihong Yu
(74) *Attorney, Agent, or Firm*—William J. Kubida; Michael C. Martensen; Hogan Lovells US LLP

(57) ABSTRACT

A method employing an improved rate-matching algorithm used during transmission and reception of information packets involves performance of a complete process of puncturing or repetition in two steps. In the first step the action to be taken on each bit of the input register is calculated and is stored in the form of flag bits in flag register. In step 2, puncturing/repetition are performed on input bits and the output is stored in output register. Input bits can be processed in groups in step 2, reducing the number of steps required in the complete rate matching process.

13 Claims, 8 Drawing Sheets

METHOD FOR RATE MATCHING IN DATA TRANSMISSION

FIELD OF THE INVENTION

The present invention relates to the field of communications and in particular to wireless communication systems. More particularly the invention relates to a method and system for rate matching during reception of transmitted information packets.

BACKGROUND OF THE INVENTION

Any communication network comprises of two fundamental parts, the nodes and the links. A node is some type of network device, such as a computer. Nodes are able to communicate with other nodes through links, like cables. Communication between nodes can be established by creating a closed circuit between two nodes in the network. However this technique does not utilize available capacity efficiently. Another technique that has become predominant in the field of communications, especially telecommunications is of packet-switched networks. Messages sent over a packet-switched network are first divided into packets containing the destination address. Then, each packet is sent over the network with every intermediate node and router in the network determining where the packet goes next. A packet does not need to be routed over the same links as previous related packets. Thus, packets sent between two network devices can be transmitted over different routes in the event of a link breakdown or node malfunction.

Packet switching dominates data networks like the internet. It provides an efficient way of data transfer. However, rapid increase in number of users of the Internet through mobile phones and other portable data devices has given rise to the problem of congestion of data lines. The demand for higher data rates has further aggravated the problem in the recent past. Code Division Multiple Access (CDMA) coding and protocol scheme has been quite successful in supporting the ever increasing cell-phone user capacity. The third generation (3G) wireless standards UMTS/IMT-2000 use the Wideband CDMA (WCDMA). This scheme supports high data rates and many data formats with different rates and qualities. The presence of more than one data format, however, results in a need to match the transfer data rate and data format to fit into CDMA channel. This is accomplished by using a technique known as rate matching.

Rate matching is a technique widely used in 3G wireless communication systems for adjusting the size of the data stream. In this technique, bits of an encoded block on a transport channel are repeated or punctured in order to match input data rate with the output data rate In cases where the input data rate is less than the fixed output data rate, certain input data bits are repeated. This is called 'Repetition'. If the input data rate is more than the output data rate, certain data bits are punctured. This is known as 'Puncturing'.

Whether a bit position is to be punctured or repeated, is determined by using $e_{ini}$, $e_{plus}$ and $e_{minus}$. These are termed as RM Parameters. They are calculated according to the technical specification of $3^{rd}$ Generation Partnership Project. (3GPP TS 25.212 v6.3.0), which is attached hereto as Appendix A.

$e_{ini}$: initial value of variable e in the rate matching pattern determination algorithm as given in 3GPP TS 25.212 v6.3.0 in the section 4.2.7.1. (in case of uplink) and section 4.2.7.2. (in case of downlink)

$e_{plus}$: increment of variable e in the rate matching pattern determination algorithm as given in 3GPP TS 25.212 v6.3.0 in the section 4.2.7.1. (in case of uplink) and section 4.2.7.2. (in case of downlink)

$e_{minus}$: decrement of variable e in the rate matching pattern determination algorithm as given in 3GPP TS 25.212 v6.3.0 in the section 4.2.7.1. (in case of uplink) and section 4.2.7.2. (in case of downlink)

The values of these parameters depend on $\Delta N$ where $\Delta N$ is number of bits to be punctured or repeated. $\Delta N$ is negative in case of puncturing and positive in case of repetition. Therefore the values of RM Parameters are different in case of puncturing and repetition.

In the conventional method of rate matching, input data bits are analyzed bit by bit. RM Parameters determine the status of each input data bit in the output data stream, which in turn determines the action to be taken on that bit. Possible actions can be puncture/repeat/no action. Since each bit is processed one at a time, the number of times each loop in the software module runs is large require more processing.

Therefore, there exists a need for a method and system employing a rate-matching algorithm that accomplishes the processes of repetition and puncturing in less number of steps and hence is faster.

SUMMARY OF THE INVENTION

An object of the present invention is to provide a method employing a rate-matching algorithm that runs in less number of steps and is less computation intensive.

The aforementioned object of the present invention is achieved by providing a method and system employing a rate-matching algorithm that processes a group of data bits simultaneously.

In the method as disclosed by the present invention, input bits are stored in input buffer and output bits in output buffer. Besides these, an additional buffer called a flag buffer is created. Flag bits corresponding to each data bit are calculated using the RM Parameters. Each flag bit indicates the action to be taken on the corresponding input data bit. The bits are then acted upon using the flag register. In this way, a group of data bits are processed simultaneously.

BRIEF DESCRIPTION OF THE ACCOMPANYING DRAWINGS

DETAILED DESCRIPTION OF THE INVENTION

The invention will now be described with reference to the accompanying figures. Although the invention is primarily being explained with reference to its application to 3GPP FDD technology. It should be understood however that the invention is also of use in other technologies like 3GPP TDD, CDMA 3K and WiMAX.

Figure 1:
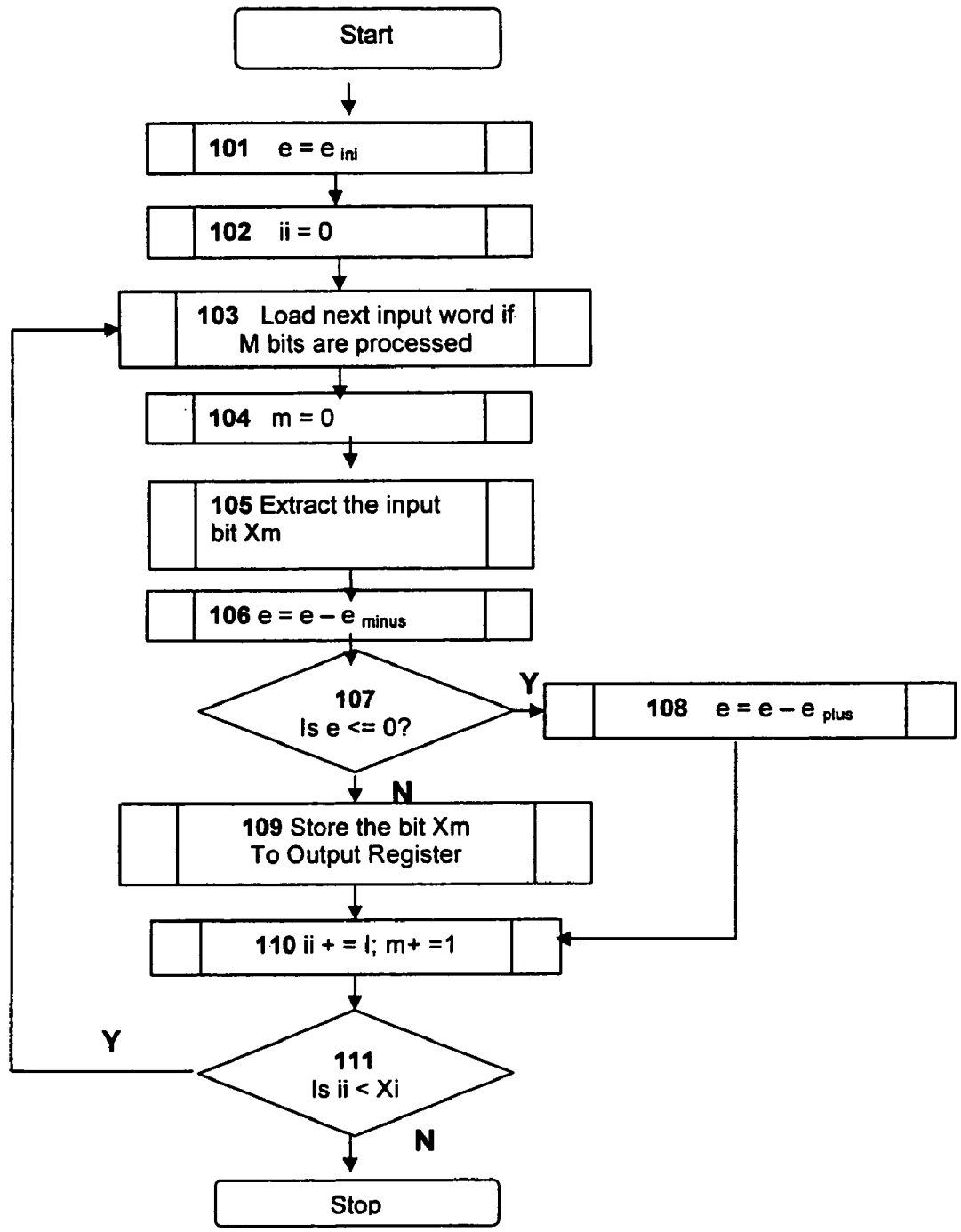
FIG. 1 is a flow chart illustrating an existing algorithm for rate matching explaining the process of puncturing.

FIG. 1 illustrates an algorithm presently used for rate matching. In this approach, the input data is processed bit by bit. Each bit is selected and using the RM Parameters, the action to be taken on that bit is determined. Possible actions can be Puncture/Repeat/No Action. The RM parameters are calculated as given in the 3GPP TS 25.212 v6.3.0 in the section 4.2.7.1 (in case of uplink) and in the section 4.2.7.2 (in case of downlink).

FIG. 1 illustrates the case of Puncturing. It is assumed in this case that the input data is in M bits packet format. In 101, the value of e, the initial error between current and desired puncturing ratio, is set to $e_{ini}$. In 102, the index of number of bits already processed (ii) is reset to 0. In 103, the input word is loaded. In 104, index of current bit (m) is reset to 0. In 105, the mth bit from the input word is extracted. In 106 the error (e) is updated using the value of RM Parameter ($e_{minus}$). In 107, the updated error is checked. In this step, it is judged whether the current bit is to be punctured or not. If the current bit is to be punctured, the processing flow proceeds to 108. Else the flow proceeds to 109. In 108, the error (e) is updated using the value of RM Parameter ($e_{plus}$) and then the flow proceeds to 110 where values of ii and m are updated by 1. In 109, the current bit is stored as it is in the output register and the processing flow proceeds to 110. In 111 it is judged whether all data has been rate matched. If the number of bits already processed (ii) is equal to total number of bits to be processed (Xi), then process is brought to an end else the processing flow goes to 103.

Figure 2:
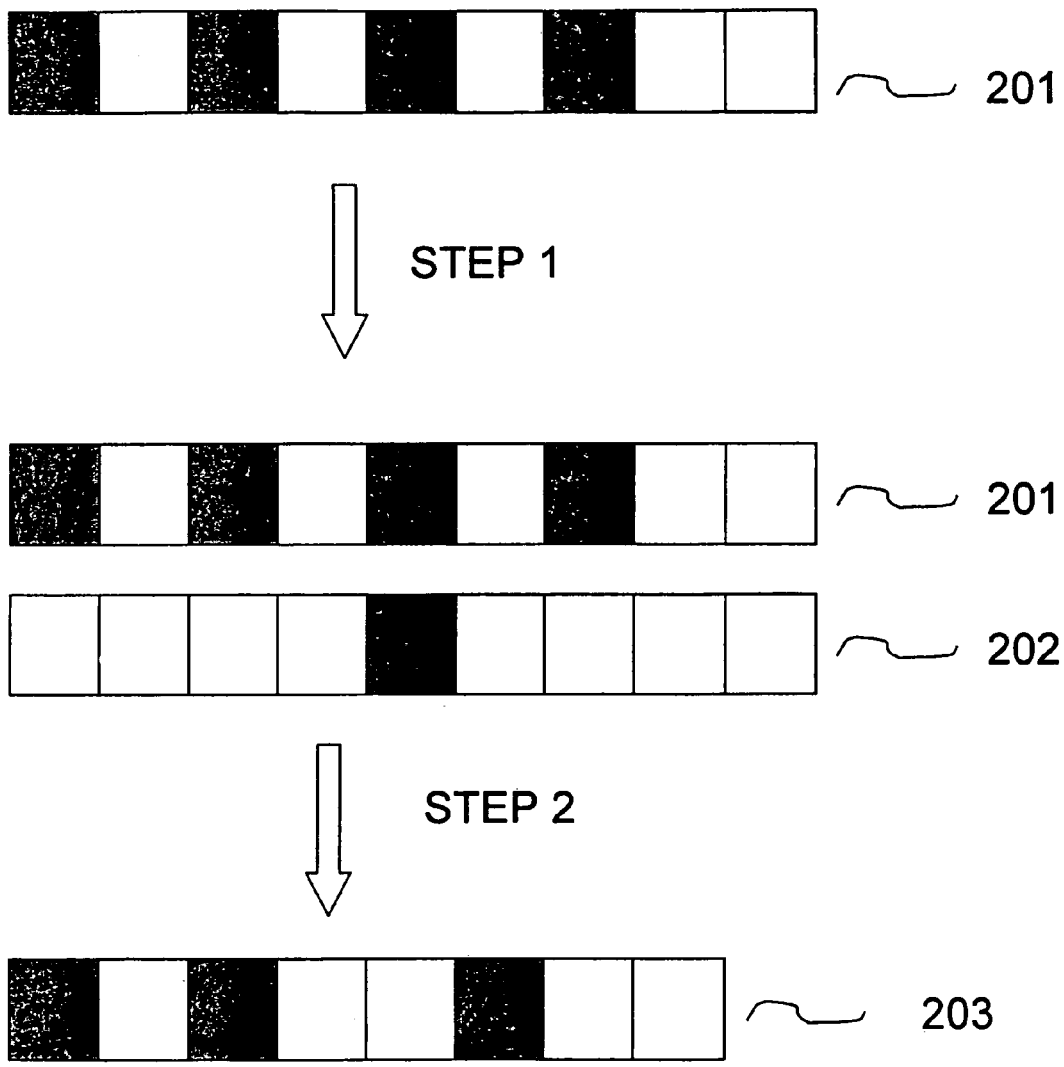
FIG. 2 shows a block diagram illustrating the puncturing configuration in accordance with the present invention.

The pseudo code used for the process explained in FIG. 1 is as follows:

register. FIG. 2 illustrates the puncturing case for a data stream having 8 output bits and input data stream with 9 bits. However, the same technique is applicable for a data stream of any size. The figure shows a data register (201) and a flag register (202). Both the data and the flag register have 9 bits. nth bit of the flag register corresponds to the nth bit of the input data register. In step 2, the input data bits are acted upon by the corresponding flag bits. Each bit of the flag register can have value low or high. In this case of puncturing process, high in the flag register represents that the corresponding bit in the input register has to be punctured whereas low in the flag register represents that the corresponding input data bit is copied as it is in the output register. The resulting bits are then stored in the output register (203). In the figure it is seen that first 4 MSBs in the flag register are low, hence no action is required on the corresponding bits in the input data register. These input bits can be collected in the output register in a single cycle. Since the $5^{th}$ MSB in the flag register is 1, the fifth bit in the data register is punctured. As a result of puncturing, the length of the data stream in output register is less than the input register by one bit. This process continues until all the inputs bits are processed. The buffers used for the purpose of storage are generally explained herewith in the form of registers. However, any other type of suitable buffer may also be used.

Figure 3:
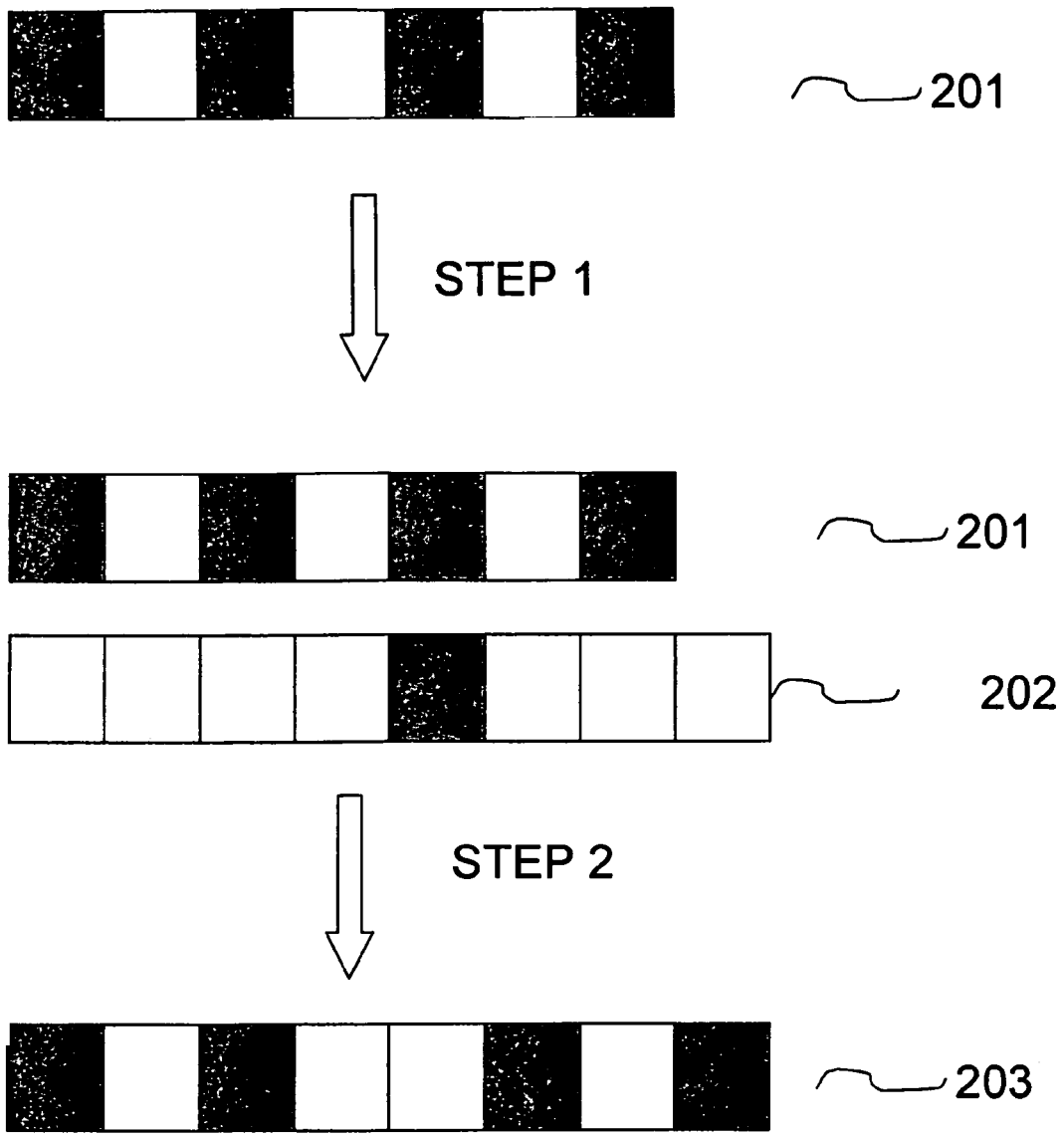
FIG. 3 shows a block diagram illustrating the repetition configuration in accordance with the present invention.

FIG. 3 shows a block diagram illustrating a repetition configuration of disclosed algorithm. In this case of repetition, the number of bits in the flag register is same as the number of bits in the output register. Each bit in the flag register corresponds to a bit in the output register. High in the flag register represents repeated bit in output register whereas low in the flag register represents that the corresponding bit in the output register has been copied directly from the input data register.

```
e = e_ini                                  —initial error between current and desired puncturing ratio
ii = 0                                     —index of number of bits already processed
do while ii <= Xi                          —Xi : number of input bits to be processed
        if ii % M == 0                     —M: number of bits in one word of input/output/flag register
                load next input word       —input word = x_{1,2,....,M}
                m = 0                      —index of current bit
        end if
        extract the input bit x_m
        e = e - e_minus                    —update error
        if e <= 0                          —check if bit number m should be repeated
                // puncture the bit x_m    —don't store the extracted bit x_m to output register
                e = e + eplus              —update error
        else
                outreg = ( outreg <<1 | x_m )   —store the bit x_m to out reg
        end if
        ii = ii + 1                        —next iteration
        m = m +1                           —next bit
end do
```

FIG. 2 shows a block diagram illustrating the puncturing configuration of the rate-matching algorithm in accordance with the present invention. In the disclosed algorithm, the rate matching process is broken into two steps. In step 1, flags corresponding to each input data bit are calculated by using RM Parameters. Each flag indicates about the action on corresponding bit in input data register and are stored in a separate register called flag register. The number of flags in the flag register is equal to the number of bits in the input data The figure explains the process of repetition in case of input data stream with 7 bits and output data stream with 8 bits. However, the same technique is applicable for a data stream of any size. In the figure it is seen that first 4 MSBs in the flag register are zero, hence 4 MSBs of the output register are the original bits in the input data register. These input bits are collected in the output register in a single cycle. Since the $5^{th}$ MSB in the flag register is 1, the fifth bit in the output register is the repeated bit which is the $4^{th}$ MSB in the input data register. The repeated bit is placed next to the original bit. As a result of repetition, the length of the data stream in the output register is more than that in the input register by one bit. This process continues until all the bits in the input register have been processed. The buffers used for the purpose of storage are generally explained herewith in the form of registers. However, any other types of buffers may also be used.

Figure 4:
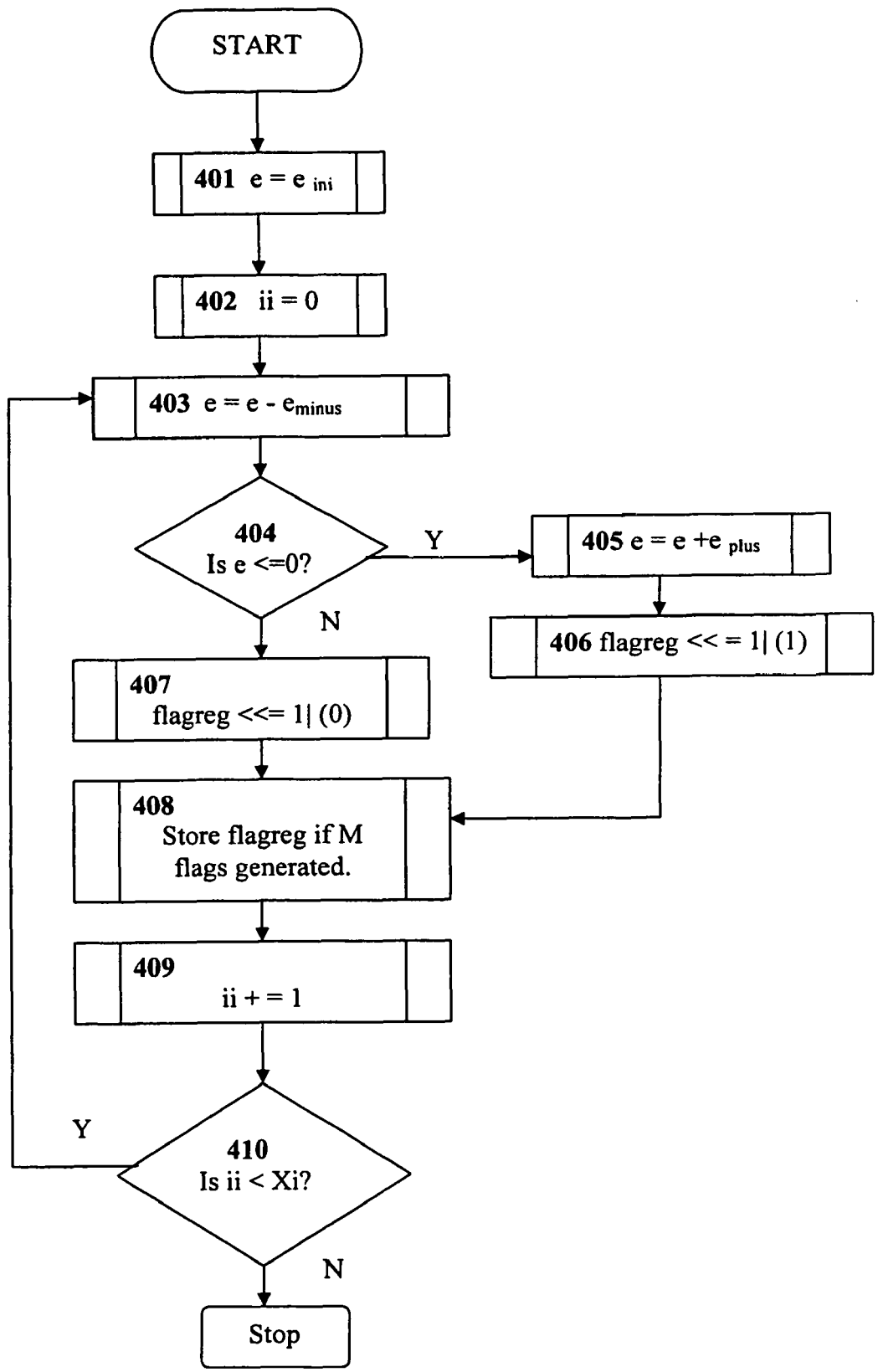
FIG. 4 is a flow chart illustrating the first step of the puncturing configuration as disclosed by the present invention.

FIG. 4 is a flow chart illustrating the first step of the puncturing configuration of rate matching algorithm as disclosed by the present invention. In the first step of this approach, flag bits corresponding to input data bits are calculated using RM Parameters and stored in the flag register. The input, output and flag bits are in M bits packed format.

In 401, the value of e, the initial error between current and desired puncturing ratio, is set to $e_{ini}$. In 402, the index of number of bits already processed (ii) is reset to 0. In 403, the error (e) is updated using the RM Parameter, $e_{minus}$. In 404, the updated error is checked. In this step, it is judged whether the current bit is to be punctured or not. If the current bit is to be punctured, the processing flow proceeds to 405. Else the flow proceeds to 407. In 405, the error (e) is updated using RM Parameter, $e_{plus}$. The flow then proceeds to 406 where the flag is set high and then to 408. In 407 the flag register is set low. In 408, the flag register is stored. In 409, the input bit counter (ii) is incremented by one. In 410, it is judged whether all data has been rate matched. If the number of bits already processed (ii) is equal to total number of bits to be processed (Xi), then process is brought to an end else the processing flow goes to 403.

Figure 5:
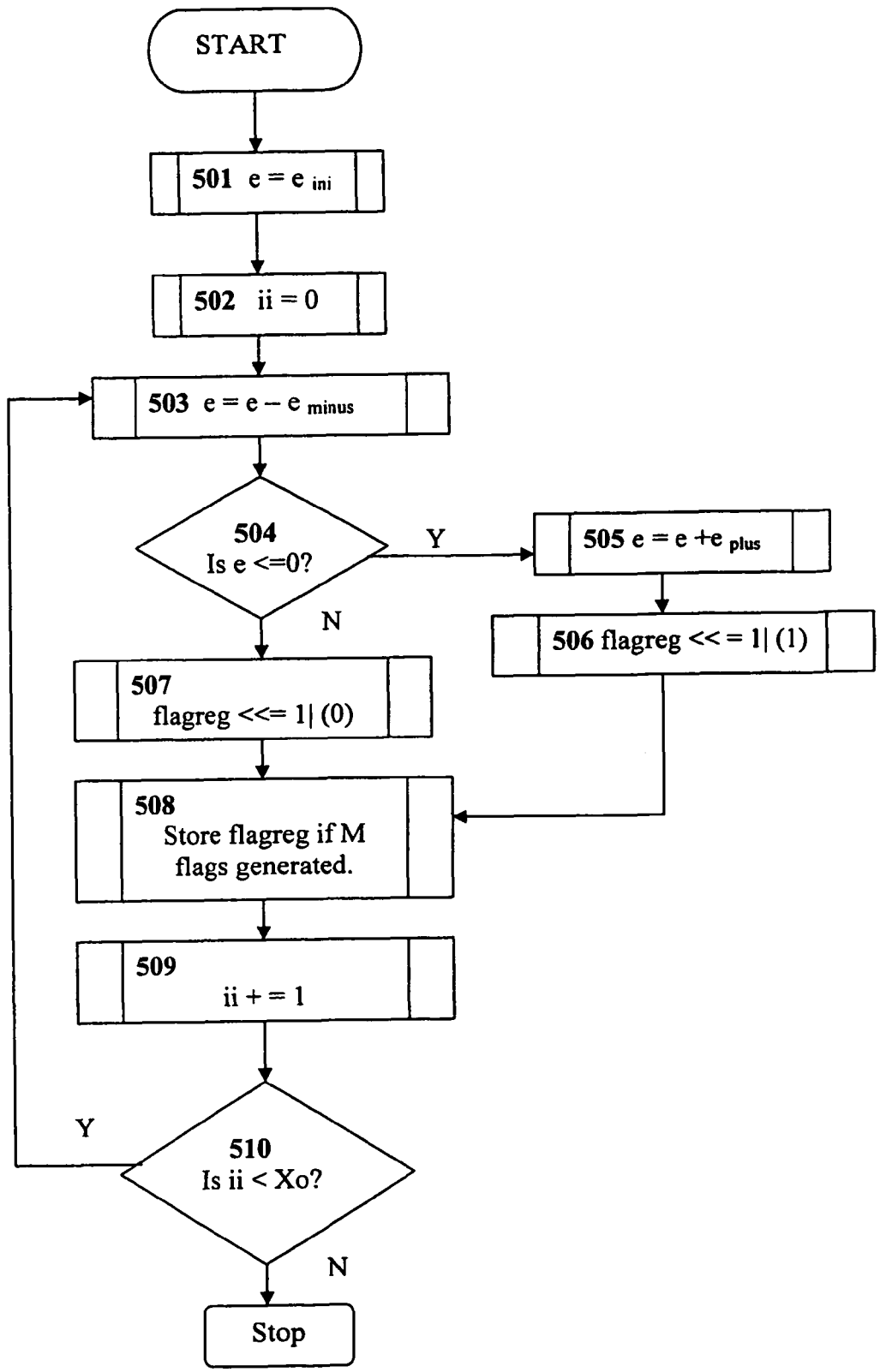
FIG. 5 is a flow chart illustrating the first step of the repetition configuration as disclosed by the present invention.

FIG. 5 is a flow chart illustrating the first step of the repetition configuration of rate matching algorithm as disclosed by the present invention. The input, output and flag bits are in M bits packed format. In 501, the value of e, the initial error between current and desired puncturing ratio, is set to $e_{ini}$. In 502, the index of number of output bits already processed (ii) is reset to 0. In 503, the error (e) is updated using the RM Parameter, $e_{minus}$. In 504, the updated error is checked. In this step, it is judged whether the current bit is to be repeated or not. If the current bit is to be repeated, the processing flow proceeds to 505. Else the flow proceeds to 507. In 505, the error (e) is updated using RM Parameter, $e_{plus}$. The flow then proceeds to 506 where the flag is set to high and then to 508. In 507 the flag register is set to low. In 508, the flag register is stored. In 509, the output bit counter (ii) is incremented by one. In 510, it is judged whether all data has been rate matched. If the number of bits already processed (ii) is equal to total number of output bits to be processed (Xo) then process is brought to an end else the processing flow goes to 503.

The pseudo code used for step 1 of puncturing process as disclosed by the present invention is given below.

```
e = e_ini                              —initial error between current and desired puncturing ratio
ii = 0                                 —index of number of bits already processed
do while ii < = Xi                     —Xi : number of input bits to be processed
    e = e − e_minus                    —update error
    if e <= 0                          —check if bit number m should be repeated
    {
        e = e + eplus                  —update error
        flgreg = ( flgreg << 1|1)      —set the flag indicator for corresponding bit
    }
    else
        flgreg = ( flgreg << 1|0)      —set the flag indicator for corresponding bit
    end if
    If ( flgreg = = M)                 —M: number of bits in one word of input/output/flag register
        Store flgreg
    ii = ii + 1                        —next iteration
end do.
```

The pseudo code used for step 1 of repetition process as disclosed by the present invention is given below.

```
e = e_ini                              —initial error between current and desired puncturing ratio
ii= 0                                  —index of number of output bits already processed
do while ii < = Xo                     —Xo : number of output bits to be processed
    e = e − e_minus                    —update error
    if e <= 0                          —check if bit number m should be repeated
    {
        e = e + e_plus                 —update error
        flgreg = ( flgreg << 1|1)      —set the flag indicator for corresponding bit
    }
    else
        flgreg = ( flgreg << 1| 0)     —set the flag indicator for corresponding bit
    end if
    If ( flgreg = = M)                 —M: number of bits in 1 word of input/output/flag register
        Store flgreg
    ii = ii + 1                        —next iteration
end do.
```

Figure 6:
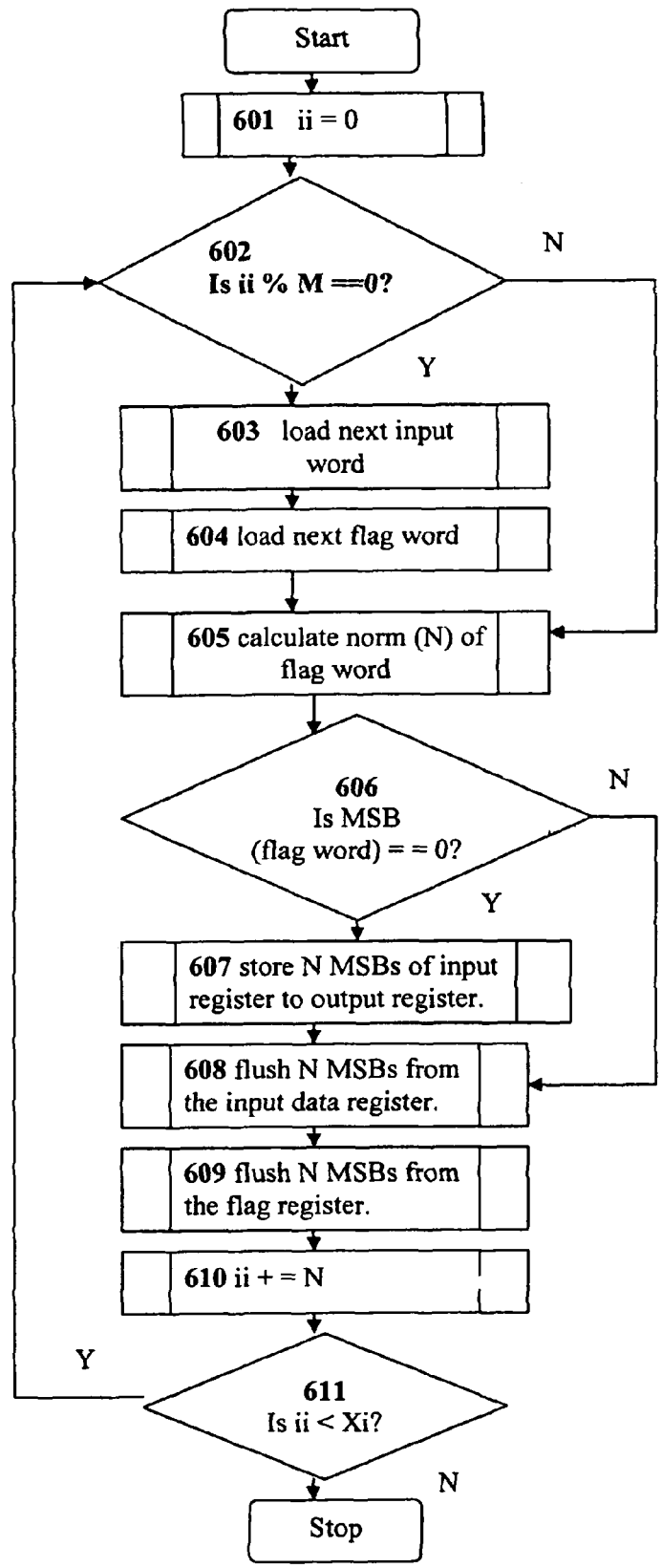
FIG. 6 is a flow chart illustrating the second step of the puncturing configuration as disclosed by the present invention.

FIG. 6 is a flow chart illustrating the second step of the puncturing configuration of rate matching algorithm as disclosed by the present invention. In this step, bits are actually punctured. Inputs to this step are data input register (201) and flag register (202). This step is implemented in two loops, outer loop for the number of input words and inner loop to process bits of each word. In each iteration of the inner loop, the number of consecutive bits (say N) having same sign as of the MSB in flag register are calculated. N can be found out using NORM instruction in ST100DSP platform or NORM instruction in TI's TMS320C62x Processor. If the MSB of flag register is low, then N MSBs of input register are collected in the output register. N MSBs each from the data register and the flag register are then flushed out. The inner loop count is then increased by N. If MSB of flag register is high, then N MSBs each from data register and flag register are flushed out without storing in the output register.

In 601, input bit index (ii) is reset. In 602, it is checked if all the bits in the input word are processed. If yes, then the process flow proceeds to 605 through 603 and 604. Else the flow proceeds directly to 605. In 603 and 604, next input word and next flag word are loaded respectively. In 605, norm (N) of the flag word is calculated where N is the number of consecutive bits having same sign as of MSB in the flag register. In 606, the sign of MSB of the flag word is checked. If sign is low, then N MSBs of the data register are stored in the output register. N MSBs of data register are then flushed out. These two steps are done in 607 and 608. If the MSB of the flag register is not low then N MSBs of data register are flushed out without storage. Process flow then proceeds to 609 where N MSBs from flag register are flushed out. Input bit counter is then incremented by N in 610. In 611, it is judged whether all data has been rate matched. If the number of bits already processed (ii) is equal to total number of bits to be processed (Xi), then process is brought to an end else the processing flow goes to 602.

Figure 7:
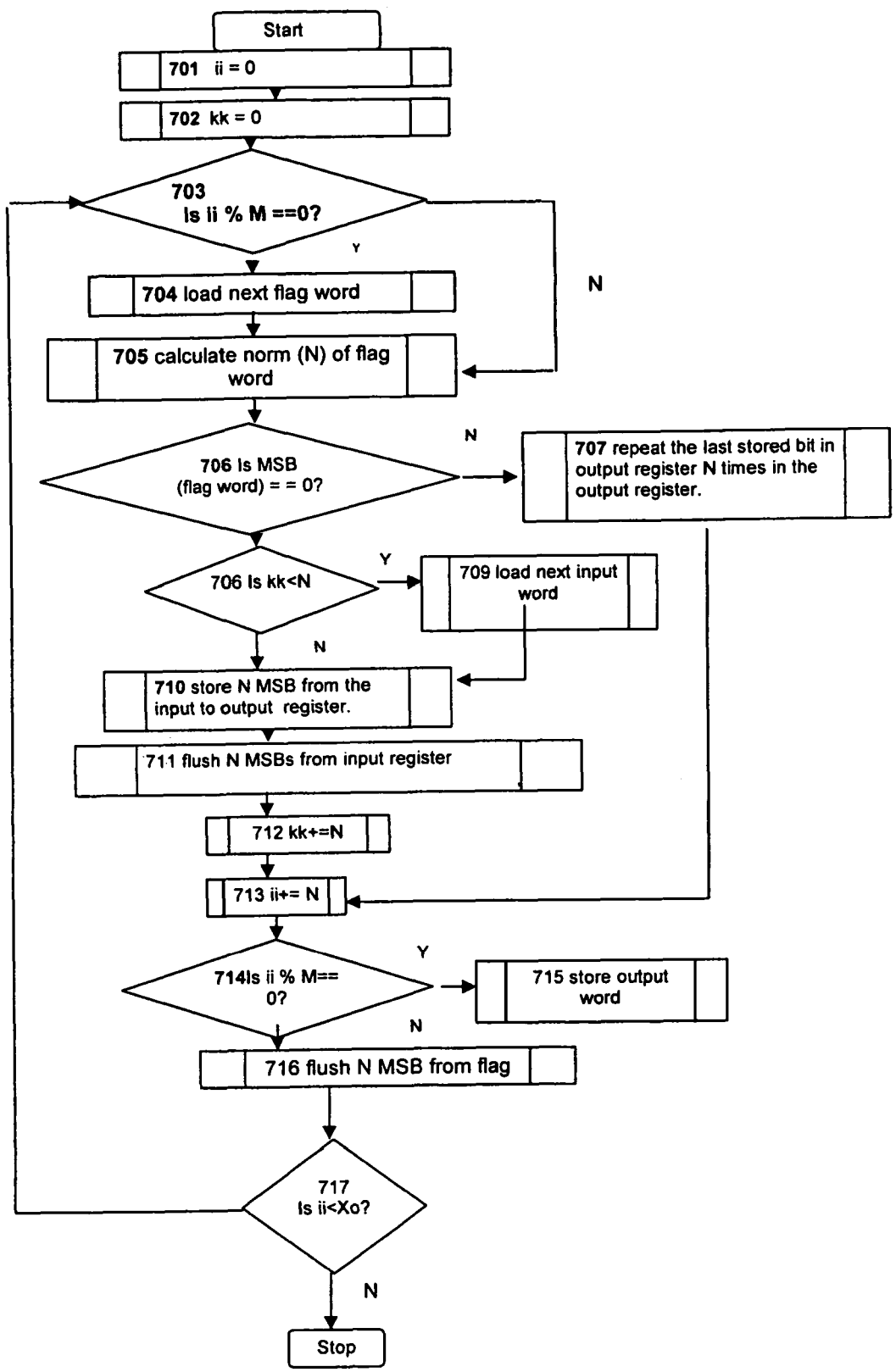
FIG. 7 is a flow chart illustrating the second step of the repetition configuration as disclosed by the present invention

FIG. 7 is a flow chart illustrating the second step of the repetition algorithm as disclosed by the present invention. The input, output and the flag data is in M bits packed format. In 701, output bit index (ii) is reset. In 702, input bit index (kk) is reset. In 703 it is checked if all the bits in the output word have been processed. If yes, then the process flow proceeds to 705 through 704. Else the flow proceeds directly to 705. In 704, next flag word is loaded. In 705, norm (N) of the flag word is calculated. In 706, the sign of MSB of the flag word is checked. If sign is high then last stored bit in output register is repeated N times in the output register. This is done in 707. The flow then proceeds to 713. If sign is low, then in 708 it is checked if input index is less than N. if yes, then next input word is loaded as shown in 709. The flow then proceeds to 710. Else the flow directly proceeds to 710 from 708. In 710, N MSBs of the input data register are stored in the output register. N MSBs of input data register are then flushed out. This is done in 711. Input bit counter is then incremented by N in 712. In 713, output counter is incremented by N. in 714 it is judged whether current output word is complete. If yes, then the word is stored as done in 715. The flow then proceeds to 716 where N MSBs from flag register are flushed out. In 717, it is judged whether all data has been rate matched. If the number of bits already processed (ii) is equal to total number of bits to be processed (Xo), then process is brought to an end else the processing flow goes to 703.

The pseudo code used for step 2 of puncturing process as disclosed by the present invention is given below.

```
ii=0                          —index of number of bits already processed
do while ii <=Xi              —Xi : number of input bits to be processed
  if ii % M == 0              —M: no of bits in one word of input, output and flag register
    Load next input word      —input word = x_{1, 2... M}
    Load next flag word       —flag word = f_{1, 2... M}
  end if
  N= find no. of consecutive bits having same sign as of MSB in flag
     register starting from MSB position.
  if (sign(MSB) == 0)
    Store N MSBs from input word to output word.
  End if
  If output bits == M
    Store output word
  End if
  Flush   MSB data bits and N MSB flags from their respective
          registers and align rest of the bits to MSB
  ii+ = N;                    —update the loop counter
End do.
```

The pseudo code used for step 2 of repetition process as disclosed by the present invention is given below.

```
ii=0                            —index of number of output bits
kk=0                            —index of number of input bits
do while ii <=Xo                —Xo : number of output bits to be processed
  if ii%M == 0
    Load next flag word         —flag word f_{1, 2...M}
                                assuming M is multiple of N and
                                is always of same value else take care is required
  end if
  N= find no. of consecutive bits having same sign as of MSB in
  flag register starting from MSB position.
  if (sign(MSB) == 0)
    if kk < N
      load next input word and concatenate with
```

```
            remaining input bits in input register
        end if
    Store N MSBs from input word to output word.
    Flush N MSB from input word and align rest of the bits to MSB
        kk+ = N;                —update the input bits counter
    Else
    Store N bits in output register having same sign as of last bit
    in output register
    end if
    ii += N
    if ii%M == 0
        Store output word       —assuming M is multiple of N
                                and is always of same value else
                                take care is required for
                                concatenating M bits in output register
    end if
    Flush N MSB from flag register and align rest of the bits to MSB
end do.
```

Although the above method has been described using MSB as the reference point, the inventive step is equally applicable if LSB is used as the reference point. Correspondingly all the buffers would be processed accordingly. The sign of LSB in this case would have to be determined using special read as NORM instruction provides sign of MSB only.

Figure 8:
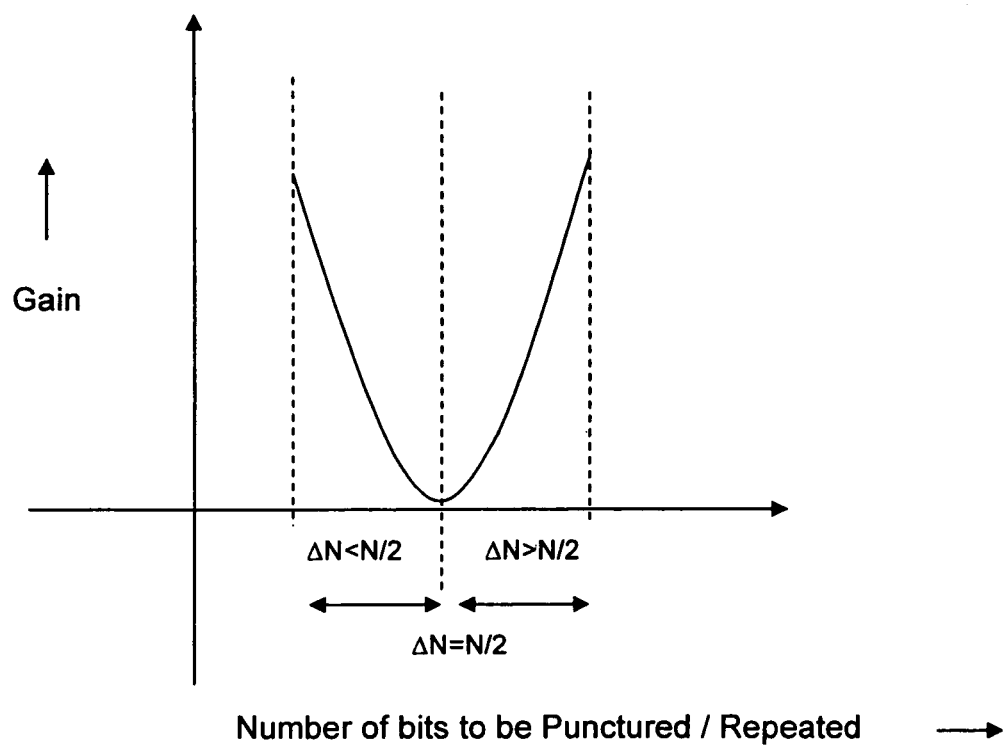
FIG. 8 shows gain vs. number of punctured/repeated bits obtained by using 3GPP test cases.

FIG. 8 shows a graph obtained by plotting values of test cases. The graph shows the gain in terms of cycle savings with respect to amount of puncturing or repetition vs. number of bits to be punctured/repeated ($\Delta N$). It is seen that the gain decreases from a maximum value to zero as the number of bits to be punctured/repeated increases to N/2 where N is the number of input bits. The graph has been plotted using parameters from following test cases.

| 12.2 kbps | $N = 804, \Delta N = -118$ | Puncturing |
| 64 kbps | $N = 3900, \Delta N = 114$ | Repetition |
| 144 kbps | $N = 8700, \Delta N = -236$ | Puncturing |
| 384 kbps | $N = 11580, \Delta N = -2531$ | Puncturing |

It is evident that the algorithm as disclosed by the present invention provides gain in terms of cycle saving for all cases except when number of bits to be punctured/repeated is half the number of input bits.

The algorithm as disclosed by the present invention may be applied to CDMA 2K and WiMAX technologies as well. In these technologies, the rate matching pattern (puncturing or repetition pattern) is fixed. As a result, the location of the bit to be punctured or repeated is fixed. Therefore, the disclosed algorithm may be applied to these technologies by initializing the fixed pattern in the flag register.

It is to be understood that the above described arrangements are only illustrative of the application of the principles of the present invention. Numerous modifications and alternative arrangements may be devised by those skilled in the art without departing from the scope of the present invention, and the appended claims are intended to cover such modifications and arrangements.

I claim:

1. A method for rate matching between an input data stream and an output data stream, said input data stream having a higher data rate than the output data stream, said data being loaded in a group of data bits with said input data bits being stored in an input buffer and said output data bits being stored in an output buffer, said method comprising the following steps for each said group of data bits:

generating a flag buffer having equal number of bits as the input buffer, calculating bit value for each position in said flag buffer so as to indicate the status of the corresponding input data bit in the output data stream, starting from a significant bit position in the flag buffer, determining the number of consecutive bits (N) in said flag buffer having a same value as that of the bit in the significant bit position;

if the significant bit position of the flag buffer has a first state then storing N consecutive significant bits of the input buffer in the output buffer, as such, else discarding N consecutive significant bits of the input buffer while writing the output buffer;

flushing out the N consecutive significant bits from the input buffer and the flag buffer simultaneously, wherein flushing of the input buffer and the flag buffer is concurrent and begins and ends in unison; and repeating the above determining, storing or discarding, and flushing steps for the full length of said input buffer.

2. The method as claimed in claim 1, wherein the value of the flag bit determines whether the data bit at the corresponding position in the input buffer would be present in the output buffer.

3. The method as claimed in claim 1, wherein the significant bit position includes Most Significant Bit (MSB) and Least Significant Bit (LSB) positions.

4. The method as claimed in claim 1, wherein said first state is bit value 0.

5. A method for rate matching between an input data stream and an output data stream, said input data stream having a higher data rate than the output data stream, said data being loaded in a group of data bits with said input data bits being stored in an input buffer and said output data bits being stored in an output buffer, said method utilizing Rate Matching (RM) parameters $e_{ini}$, $e_{minus}$ and $e_{plus}$ as defined in section 4.2.7.1(in case of uplink) and section 4.2.7.2 (in case of downlink) of 3GPP TS 25.212 v6.3.0 and comprising the following steps for each said group of data bits:

generating a flag buffer having equal number of bits as the input buffer, calculating bit value for each position in said flag buffer so as to indicate the status of the corresponding input data bit in the output data stream, starting from a significant bit position in the flag buffer, determining the number of consecutive bits (N) in said flag buffer having a same value as that of the bit in the significant bit position;

if the significant bit position of the flag buffer has a first state then storing N consecutive significant bits of the input buffer in the output buffer, as such, else discarding N consecutive significant bits of the input buffer while writing the output buffer;

flushing out the N consecutive significant bits from the input buffer and the flag buffer simultaneously, wherein flushing of the input buffer and the flag buffer is concurrent and begins and ends in unison; and repeating the above determining, storing or discarding, and flushing steps for the full length of said input buffer, wherein a value of bits in said flag buffer is calculated using the RM parameters by:

setting the current error as $e_{ini}$, and carrying out the following steps until the flag buffer is filled:

i. updating the error using the value of $e_{minus}$, and ii. if the updated error is less than or equal to zero then setting the value of the position in flag buffer corresponding to the position of the current bit in the input buffer to a second state and updating the error using the value of $e_{plus}$ else setting the value of corresponding flag to a first state.

6. The method as claimed in claim 5, wherein said second state is bit value 1.

7. A method for rate matching between an input data stream and an output data stream, said input stream having a lower data rate than the output data stream, said data being loaded in a group of data bits with said input data bits being stored in an input buffer and said output data bits being stored in an output buffer, said method comprising the following steps for each said group of data bits:

generating a flag buffer having equal number of bits as the output data buffer, calculating bit value for each position in said flag buffer so as to indicate the status of the corresponding output data bit in the output data stream, starting from a significant bit position in the flag buffer, determining the number of consecutive bits (N) in said flag buffer having a same value as that of the bit in the significant bit position;

if the significant bit position of the flag buffer has a first state then storing N consecutive significant bits of the input buffer in the output buffer, as such, else repeating the last bit of the output buffer N times in the output buffer;

if the significant bit position of the flag buffer has a first state flushing out the N consecutive significant bits from data buffer and the flag buffer simultaneously, wherein flushing of the data buffer and the flag buffer is concurrent and begins and ends in unison else flushing out N consecutive significant bits from the flag buffer; and repeating the above determining, storing or discarding, and flushing steps for the full length of said flag buffer.

8. The method as claimed in claim 7, wherein the value of the flag bit determines whether the data bit at the corresponding position in the output buffer is a repeated bit.

9. The method as claimed in claim 7, wherein the significant bit position includes Most Significant Bit (MSB) and Least Significant Bit (LSB) positions.

10. The method as claimed in claim 7, wherein said first state is bit value 0.

11. The method as claimed in claim 7, wherein said second state is bit value 1.

12. The method as claimed in claim 7, wherein bits of said flag buffer are initialized according to the fixed rate matching patterns as per the pre-defined puncturing and repetition patterns.

13. A method for rate matching between an input data stream and an output data stream, said input data stream having a lower data rate than the output data stream, said data being loaded in a group of data bits with said input data bits being stored in an input buffer and said output data bits being stored in an output buffer, said method utilizing Rate Matching (RM) parameters $e_{ini}$, $e_{minus}$ and $e_{plus}$ as defined in section 4.2.7.1 (in case of uplink) and section 4.2.7.2 (in case of downlink) of 3GPP TS 25.212 v6.3.0 and comprising the following steps for each said group of data bits:

generating a flag buffer having equal number of bits as the output data buffer, calculating bit value for each position in said flag buffer so as to indicate the status of the corresponding output data bit in the output data stream, starting from a significant bit position in the flag buffer, determining the number of consecutive bits (N) in said flag buffer having a same value as that of the bit in the significant bit position;

if the significant bit position of the flag buffer has a first state then storing N consecutive significant bits of the input buffer in the output buffer, as such, else repeating the last bit of the output buffer N times in the output buffer;

if the significant bit position of the flag buffer has a first state flushing out the N consecutive significant bits from data buffer and the flag buffer simultaneously wherein flushing of the data buffer and the flag buffer is concurrent and begins and ends in unison else flushing out N consecutive bits from the flag buffer; and repeating the above determining, storing or discarding, and flushing steps for the full length of said flag buffer, wherein a value of bits in said flag buffer is calculated using the RM parameters by:

setting the current error as $e_{ini}$, carrying out the following steps until the flag buffer is filled:

i. updating the error using the value of $e_{minus}$, and ii. if the updated error is less than or equal to zero then setting the value of the position in flag buffer corresponding to the position of the current bit in the output buffer to a second state and updating the error using the value of $e_{plus}$ else setting the value of corresponding flag to a first state.

* * * * *